Patented Mar. 10, 1931

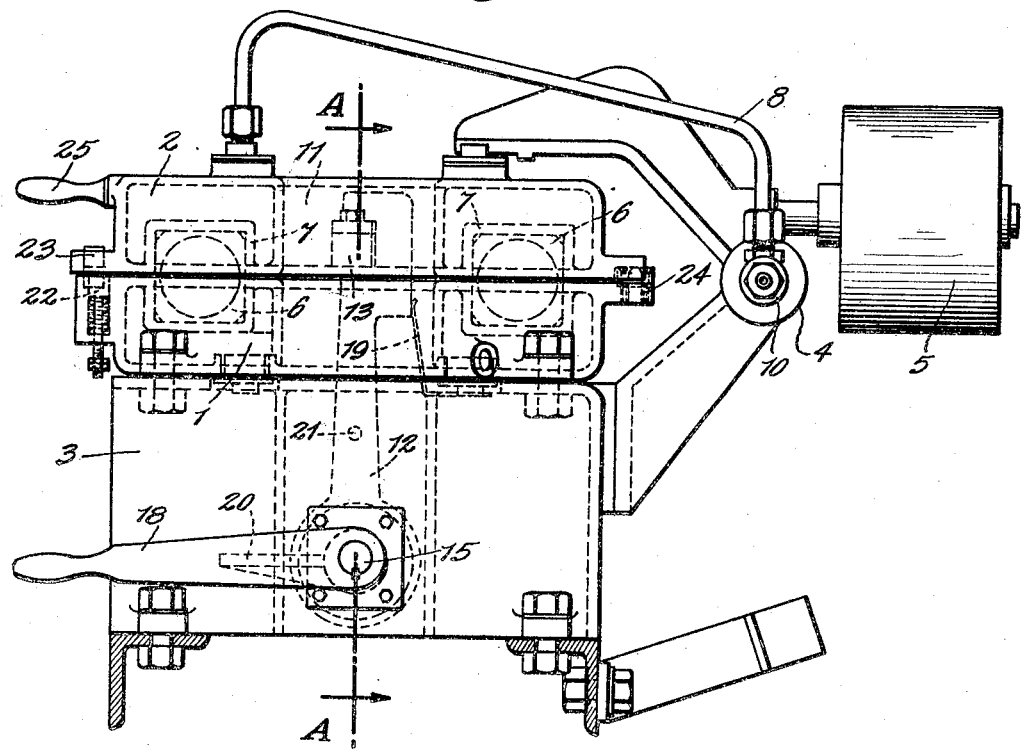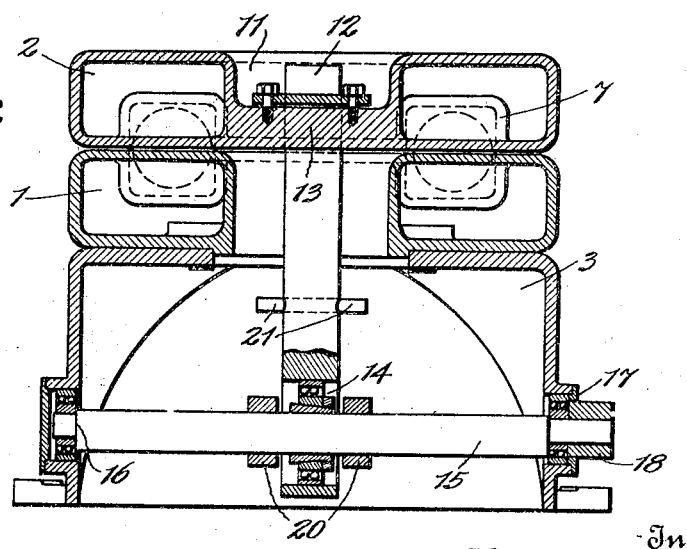

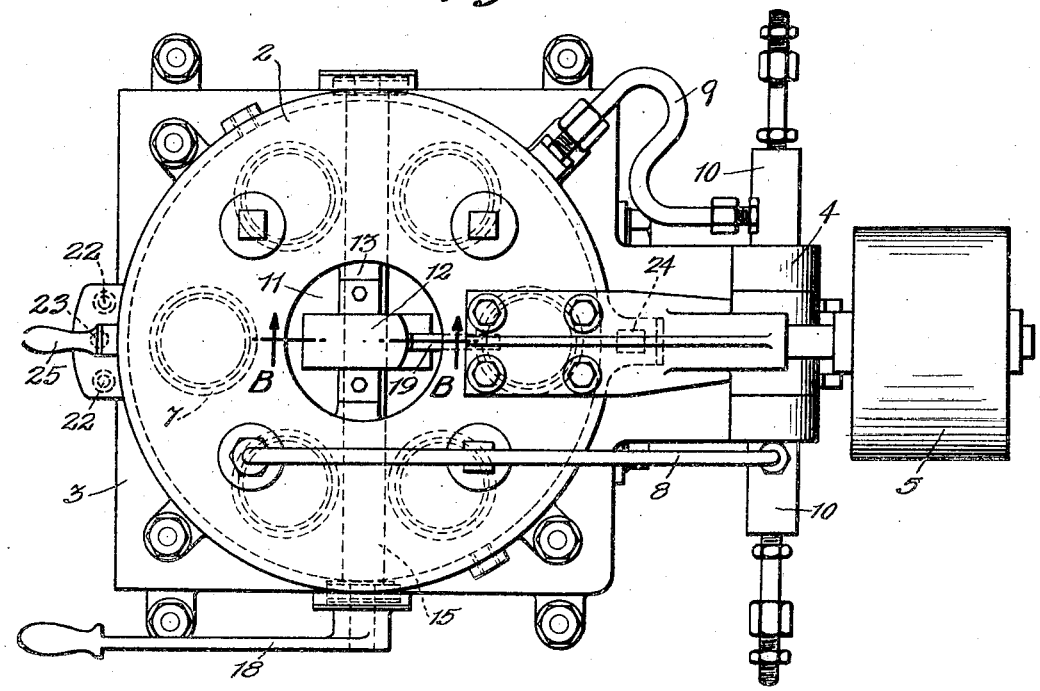
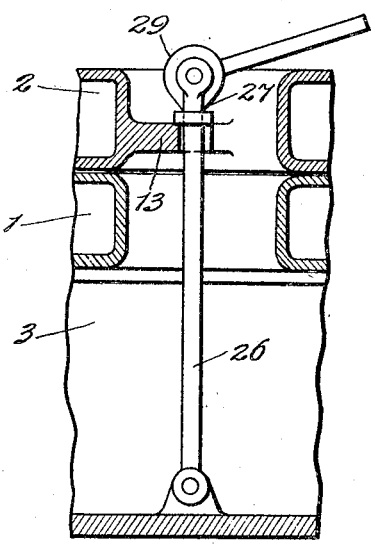
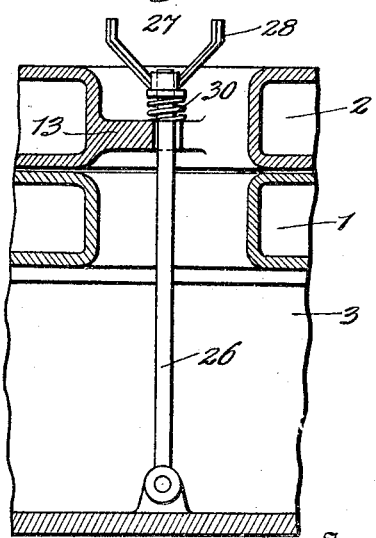

1,795,917

UNITED STATES PATENT OFFICE

HARRY WILLSHAW, OF WYLDE GREEN, AND SYDNEY NEVILLE GOODHALL, OF MARSTEN GREEN, ENGLAND, ASSIGNORS TO DUNLOP TIRE AND RUBBER CORPORATION, AN AMERICAN CORPORATION

APPARATUS FOR MOLDING RUBBER ARTICLES

Application filed May 6, 1930, Serial No. 450,082, and in Great Britain May 5, 1929.

This invention relates to molding of hollow articles particularly of playing balls, for example, tennis balls, and more particularly to molding apparatus comprising individually hinged heating chambers of the "pot" or watch case type.

Objects of our invention are to provide a compact and conveniently operated molding apparatus of the above type; to provide effective and readily operated closing, clamping and opening means for apparatus of the above type, and to provide apparatus of the above type that may be operated in batteries or may be operated by automatic mechanisms.

With these and other objects in view which will more fully appear from the following description, the invention comprises the apparatus described in the following specification and claims.

The various features of the invention are illustrated in the accompanying drawings, in which—

Fig. 1 is a side view, parts being broken away to show the interior construction, of a preferred form of apparatus embodying our present invention.

Fig. 2 is a vertical section of the apparatus taken on the line 2—2 of Fig. 1.

Fig. 3 is a plan view of the apparatus, and

Figs. 4 and 5 are sectional views of the apparatus taken on the line 4—4 of Fig. 3, but showing the modified forms of embodiment.

In our invention the hollow articles, such as tennis balls, are molded in apparatus comprising a fixed heated chamber and a movable heated chamber, the movable heated chamber being hinged relatively to the fixed chamber and adapted to swing freely to and from said fixed chamber. The chambers are preferably arranged horizontally with the fixed chamber underneath and the hinged chamber so arranged that it may be lifted on its hinge to an upright position, or lowered to rest upon the lower chamber. These chambers are preferably of annular form having a number of molds, six being shown in the accompanying drawings, formed of complementary parts, one part being fixed or formed in the upper chamber and the other part being fixed or formed in the lower chamber. When the upper chamber is in position resting on the lower chamber it is locked and clamped against the latter by means of a locking and compressing arrangement that exerts a forced multiplying action, preferably by means of an eccentric toggle arrangement. This locking or toggle mechanism, however, exerts a resilient or springing action in locking the two chambers to ensure a tight locking without the necessity of making adjustments for unevenness. When the clamping and locking mechanism is moved reversely to unlocking position it also exerts an opening force on the upper chamber.

Referring to Figs. 1, 2 and 3 of the accompanying drawings, the invention is shown as embodied in apparatus comprising two superposed steam chests 1 and 2, the lower chest 1 being disposed horizontally or substantially so, and fixed to a suitable frame 3, and the upper chest 2 being hinged at 4 in relation to the lower chest and provided with a suitable balance weight 5. The frame 3 is adapted to be fixed to a table or other support to position it at a convenient working height.

The chests carry the mold members and, as shown particularly in Fig. 1, the latter are separate hemispherical shells 6 let into appropriately shaped depressions 7 in said chests. Alternately, the chests themselves may be provided with the required molding surfaces.

The apparatus shown in Figs. 1, 2 and 3 is designed to treat six balls, each chest carrying six shells each of which mates with a complementary shell as shown in Figs. 1 and 2 to give the required six molding cavities as shown in Fig. 3.

Steam is circulated through the chests via suitable piping; the steam for the top chest entering by the pipe 8 and leaving by the pipe 9, passes through the trunnion or hinge 10 for said chest, as shown particularly in Fig. 3. Water may also be circulated through the system for cooling purposes.

As shown in the drawings the chests 1 and 2 are in the form of annular rings having a central bore or aperture 11—other forms providing such a central aperture may also be used.

This allows the required pressure to be exerted between the chests for closing and opening by a centrally disposed clamp or the like, thus superseding the usual tire-pot arrangement utilizing a plurality of clamps spaced around the outer periphery of the chests.

As shown in Figs. 1, 2 and 3 of the drawings, pressure is exerted by eccentric gear, the clamp comprising a pivotal claw lever 12 adapted to engage a bridge piece 13 extending across the bore 11, of the hinging chest 2. Said lever 12 is pivotally mounted, as shown at 14, on a shaft 15 which is eccentrically mounted as shown at 16 in bearings 17 each side of the frame 3. Pressure is applied by rotating said shaft, by means of a handle 18 attached to it, thereby to displace said lever by the eccentric "throw" of said shaft.

The pressure to keep the chests closed is preferably applied through a spring medium—in this way the molding pressure is characterized in a desirable resiliency, any slight misalignment or separation, or tendency thereto of the contacting chests or molds is allowed for, and the necessity for small adjustments of the eccentric as to take up wear is obviated. As shown in the drawings, the required resiliency is provided by the shaft 15 which carried the claw lever 12, said shaft being so designed that it will spring or "whip" slightly between its bearings 17 when the toggle pressure is applied.

The claw lever may, as shown at 19, Fig. 1, be spring loaded normally to bear toward and engage the bridge piece 13 and the handle 18 may in the reverse or opening movement be used to pass said claw lever clear of the bridge piece so as to give the hinging chest a clear path both in opening and closing. As shown in Figs. 1 and 2 the arrangement comprises a pair of members 20 fixed to the shaft 15, which members are adapted to co-act as hereinafter set out with pegs 21 fixed to the lever 12.

In the lower chest 1 there are provided two or more spring loaded plungers 22 which are arranged vertically so that their ends project above the surface of said lower chests as shown in Fig. 1. These plungers act as a cushion or brake to prevent the top chest being flung too violently against the lower chest in closing, with consequent damage to the chests of the mating parts of the molds. Said plungers also assist to some extent in the initial opening.

Dowels 23 and 24 on each side of the apparatus serve to align correctly the upper chest on the lower.

The operation of the apparatus is as follows, starting from the time when a fresh set of balls are about to be treated: The apparatus is in the open position, the top chest being held at an angle to the lower by its balance weight 5, and the handle 18 is in a substantially vertical position. Balls are now placed in the cavities in the lower chest and the top chest is swung downward onto said lower chest by the handle 25. To allow of this last movement the pressure handle 18 is meantime held manually pressed away from the operator slightly so that the members 20 contact the pegs 21 and so keep the claw lever 12 held back out of the way of the top chest as it descends. The chests being together, the handle 18 is now pulled toward the operator and the claw lever 12 thereupon moves under the influence of its spring to engage the bridge piece 13. Continued operation of the handle 18 in the same direction operates the eccentric gear as aforesaid to exert the required pressure between the chests, the eccentric shaft 15 passing a little over dead center to maintain the pressure. Then the apparatus is left until treatment of the balls is complete. Then the handle 18 is moved in the reverse direction, that is, away from the operator, so that the eccentric gear operates to lift the clamp and so effect initial opening or "breaking" the lower face of the claw contacting the under side of the bridge piece, and so forcing the chests slightly apart against the adhesion of the balls to the molding cavities. Continued movement of the handle 18 in the same direction causes the members 20 to contact the pegs 21 and so force the claw lever out of engagement with the bridge piece 13. The upper chest is then free to be swung manually fully clear of the lower chest by the handle 25, to allow of the removal of the finished balls.

Instead of the clamp comprising eccentric gear as described, alternatively it may comprise a swing bolt 26, Figs. 4 and 5, of which the free end 27 engages a slot in the bridge piece 13, the required pressure being exerted either by a wing nut 28, as in Fig. 4, or by a cam clamp 29 as in Fig. 5.

Instead of utilizing the spring or "whip" in the shaft 15 to provide the desired resiliency, we may use a separate spring, or alternatively, we may dispense with springing entirely. The first alternative is exemplified in Fig. 4, the spring being shown at 30, and the second alternative in Fig. 5. As a further alternative to either of these, the swing bolt 26 may be mounted on a shaft such as the shaft 15.

Instead of a single centrally disposed clamp we may use a plurality, either disposed in the bore of the chests or alternatively about their outer periphery.

The apparatus may be controlled automatically—in one such scheme closing of the apparatus starts a timing means which, after a predetermined time, operates devices to shut off the steam and flood the chests with water and, if desired, open the apparatus. A signal may also be used to indicate that the treatment is over and we may also use a graphic device to keep a record of the treatment. Suitable arrangements for this are shown in our previous British Patent No. 303,075.

And finally, instead of being used individually the apparatus may be used in batteries, the units of which may be operated by a common operating means. In one example, which also provides an automatic control alternative to or auxiliary to that set out in the next preceding paragraph, a series of units are arranged side by side and parallel to them is a driven shaft. Adjacent each unit this shaft carries or operates a cam or cams or the like adapted to effect at the proper time and in the required sequence, the various movements which would otherwise be carried out manually, for example, opening and closing the apparatus, and again operating the cocks for flooding the chests with water, draining said water from the chests and admitting steam in its place. The cams are set as between respective units so that said units are operated to suit the rate at which the operator or operators can deal with the balls.

Having now described our invention, what we claim is—

1. Apparatus for molding articles of the type described comprising a pair of heated annular chambers having complementary mold portions movable to and from each other, pressure applying means for pressing said chambers together comprising a spindle rotatable in an eccentric bearing, a lever pivoted on said spindle having its free end movable to engage a part on the other of said chambers whereby, when so engaged, said chamber is drawn toward said first chamber as said spindle is rotated in one direction, a spring loaded normally to press said lever toward and into engagement with a part on said second chamber, and means actuated by said shaft to disengage said lever from said part of said chamber upon a reverse movement of said shaft.

2. Apparatus for molding articles of the type described comprising a pair of heated annular chambers having complementary mold portions movable to and from each other, pressure applying means for pressing said chamber together comprising a spindle rotatable in eccentric, spaced, bearings and capable of being sprung between said bearings, a lever pivoted on said spindle having its free end movable to engage a part on the other of said chambers whereby, when so engaged, said chamber is drawn toward said first chamber as said spindle is rotated in one direction, a spring loaded normally to press said lever toward and into engagement with a part on said second chamber, and means actuated by said shaft to disengage said lever from said part of said chamber upon a reverse movement of said shaft.

In witness whereof we have hereunto signed our names.

HARRY WILLSHAW.
SYDNEY NEVILLE GOODHALL.